United States Patent
Jagannathan et al.

(10) Patent No.: US 10,433,116 B1
(45) Date of Patent: Oct. 1, 2019

(54) SYSTEM AND METHOD FOR GENERATING AN ADDRESS INDICATOR FOR AN OBJECT BASED ON A LOCATION OF THE OBJECT

(71) Applicant: YoGeo, Inc., Cupertino, CA (US)

(72) Inventors: Sridhar Jagannathan, Los Altos, CA (US); Subrahmanyam Kavuri, Pune (IN)

(73) Assignee: YOGEO, INC., Cupertino, CA (US)

(*) Notice: Subject to any disclaimer, the term of this patent is extended or adjusted under 35 U.S.C. 154(b) by 0 days.

(21) Appl. No.: 16/238,511

(22) Filed: Jan. 2, 2019

Related U.S. Application Data (60) Provisional application No. 62/613,055, filed on Jan. 3, 2018.

(51) Int. Cl.
| | |
|---|---|
| *H04W 4/029* | (2018.01) |
| *G06F 16/29* | (2019.01) |
| *H04W 4/02* | (2018.01) |
| *H04L 29/08* | (2006.01) |

(52) U.S. Cl.
CPC ............ *H04W 4/029* (2018.02); *G06F 16/29* (2019.01); *H04W 4/027* (2013.01); *H04L 67/1097* (2013.01)

(58) Field of Classification Search
CPC ....... H04W 4/029; H04W 4/027; G06F 16/29; H04L 67/1097
See application file for complete search history.

(56) References Cited

U.S. PATENT DOCUMENTS

| | | | | |
|---|---|---|---|---|
| 2002/0188581 | A1* | 12/2002 | Fortin | H04L 67/16 706/20 |
| 2010/0197219 | A1* | 8/2010 | Issa | H04W 4/029 455/3.06 |
| 2011/0087839 | A1* | 4/2011 | Sharma | G06F 16/29 711/118 |
| 2013/0088492 | A1* | 4/2013 | Jagadev | G06T 17/005 345/428 |
| 2015/0066962 | A1* | 3/2015 | Cortes | H04W 4/025 707/755 |
| 2018/0324546 | A1* | 11/2018 | Jones | G06F 16/951 |

* cited by examiner

Primary Examiner — Mazda Sabouri
(74) Attorney, Agent, or Firm — Minisandram Law Firm; Raghunath S. Minisandram (57) ABSTRACT

A system and method for associating an address for an object is disclosed. A smart address server is provided with a processor and memory. The smart address server is configured to receive a geo location for the object, the geo location indicative of the latitude and longitude of the location of the object. The geo location of the object is converted into a zone, sector, and target portion to generate a ZST location indicator for the object. An elevation portion is appended to the ZST location, to generate a ZSTE location indicator for the object. An object ID is assigned to the object and the object ID is appended to the ZSTE location indicator to generate a smart address for the object. The generated smart address is stored in a data store.

20 Claims, 11 Drawing Sheets

| | | |
|---|---|---|
| 440 | ZSTE LOCATION INDICATOR: | BK15.CJ5.CJ5.AK05.APT18E |
| 444 | OBJECT ID | 01 |
| | Name: | John Henry |
| 442 | Address: | 423 Alma Lane, New York, NY 11022, 18$^{th}$ Floor Apt E |
| | Contact | Skypejohn |
| | Instruction | Call before delivery |
| 446 | Mobility | STATIC |
| | Bar Code | Yes |

FIGURE 4A

| | | |
|---|---|---|
| 440 | ZSTE LOCATION INDICATOR: | BK15.CJ5.CJ5.AK05.APT18E |
| 444 | OBJECT ID | 02 |
| | Name: | John Henry |
| | Address: | 423 Alma Lane, New York, NY 11022, 18$^{th}$ Floor Apt E |
| | Contact | Skypejohn |
| 448 | Instruction | Send Alarm when set to Away |
| | Mobility | STATIC |
| | Bar Code | Yes |

FIGURE 4B

| FIELD | FIELD CHARACTERISTICS |
|---|---|
| ZSTE LOCATION INDICATOR: | ZSTE ADDRESS |
| OBJECT ID | UNIQUE IDENTIFIER |
| OWNERSHIP | BELONGS TO |
| PHYSICAL ADDRESS | STREET ADDRESS |
| GROUP ID | MASTER CLASS |
| Mobility | STATIC / MOBILE |
| OBJECT DATA | DATA STRUCTURE, DETAILS |
| OBJECT RIGHTS | CRUD RIGHTS |
| OBJECT ATTRIBUTION | 3$^{rd}$ Party Inputs |
| COMMUNICATION | DATA TRANSMISSION |
| SHARING | INTO OTHER SYSTEMS |
| ALERTS | MONITORING FOR |
| ALARMS | ESCALATION |

SYSTEM AND METHOD FOR GENERATING AN ADDRESS INDICATOR FOR AN OBJECT BASED ON A LOCATION OF THE OBJECT

RELATED APPLICATIONS

This application claims priority to US provisional patent application No. 62/613,055 filed on Jan. 3, 2018, entitled "A smart addressing methodology and implementation based on locating any spot on earth with a unique smart address with a variable height definition", which is incorporated herein by reference, in its entirety.

TECHNICAL FIELD

The present invention relates generally to associating a geo location to an object and, more particularly, generating and associating an address to the object, based on the geo location of the object.

DESCRIPTION OF RELATED ART

In the present day environment, various goods and services are provided based on a location of an object. The object may be a person, a structure, a dwelling, a store, a vehicle, a part, a device, or any item that may be associated with a location, either stationary or movable. In general, location of an object is identified based on an address of the location. However, in some applications, an address of an object may not be sufficient to provide goods and services to the object. In some examples, multiple objects may have same address and it may require manual intervention to determine and distinguish between multiple objects in the same address.

As more and more goods and services are delivered using minimal manual intervention, for example, use of drones and robots to perform these functions, there is a need to come up with an addressing scheme that is conducive for automation. Further, as location based services proliferate, objects that may not have computing smarts built-in may need to be provided those services. It is with these needs in mind, this disclosure arises.

SUMMARY OF THE INVENTION

In one embodiment, a method for associating an address for an object is disclosed. A smart address server is provided with a processor and memory. The smart address server is configured to receive a geo location for the object, the geo location indicative of the latitude and longitude of the location of the object. The geo location of the object is converted into a zone, sector, and target portion to generate a ZST location indicator for the object. An elevation portion is appended to the ZST location, to generate a ZSTE location indicator for the object. An object ID is assigned to the object and the object ID is appended to the ZSTE location indicator to generate a smart address for the object. The generated smart address is stored in a data store.

In yet another embodiment, a system for associating an address for an object is disclosed. A smart address server is provided with a processor and memory. The smart address server is configured to receive a geo location for the object, the geo location indicative of the latitude and longitude of the location of the object. The geo location of the object is converted into a zone, sector, and target portion to generate a ZST location indicator for the object. An elevation portion is appended to the ZST location, to generate a ZSTE location indicator for the object. An object ID is assigned to the object and the object ID is appended to the ZSTE location indicator to generate a smart address for the object. The generated smart address is stored in a data store.

This brief summary has been provided so that the nature of the disclosure may be understood quickly. A more complete understanding of the disclosure can be obtained by reference to the following detailed description of the preferred embodiments thereof in connection with the attached drawings.

BRIEF DESCRIPTION OF THE DRAWINGS

The foregoing and other features of several embodiments are now described with reference to the drawings. In the drawings, the same components have the same reference numerals. The illustrated embodiments are intended to illustrate but not limit the invention. The drawings include the following Figures.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose a systems and methods for generating an address for an object, based on its location. Referring now to the drawings, where similar reference characters denote corresponding features consistently throughout the figures, various examples of this disclosure is described.

Figure 1:
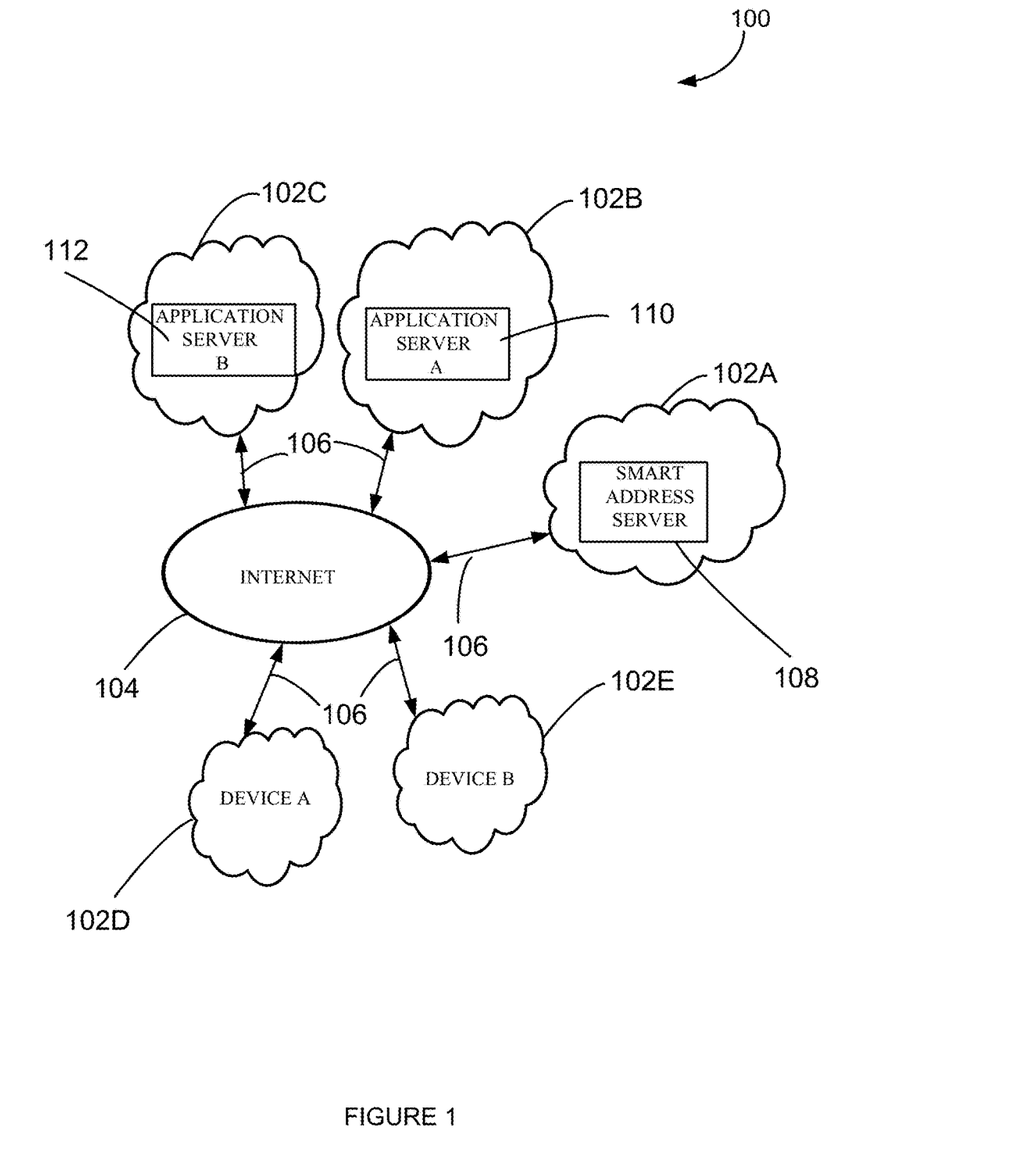
FIG. 1 shows an example computing environment with example smart address server of this disclosure, according an example of this disclosure.

FIG. 1 depicts an example network computing environment 100. The network computing environment 100 may have a plurality of computing resources, for example, computing resources 102A, 102B and 102C, all connected to internet 104, over link 106. In some examples, computing resources 102A, 102B and 102C may be a cloud computing resource, for example, cloud computing resource provided by vendors like Amazon® or Microsoft®. In some examples, the computing resources 102A, 102B and 102C may be a combination of standalone computing resources connected to the internet 106 and cloud computing resources. FIG. 1 also depicts computing resources 102D and 102E, which may be stand alone devices connected to the internet 104 over link 106.

In one example, a smart address server 108 may be executed in computing resource 102A. Additionally, one or more application servers may be executed in computing resource 102B and 102C. As an example, application server A 110 is executed on computing resource 102B and application server B 112 is executed on computing resource 102C. As one skilled in the art appreciates, application servers may be configured to provide one or more services.

In some examples, application servers may be configured as a map server, configured to provide a map associated with a location. In some examples, application servers may be configured as an enterprise resource management server, capable of providing various functions required for enterprise resource planning. As an example, enterprise resource management server may be configured to manage inventory, including ordering, tracking and fulfillment of parts. In some examples, the application server may be configured to provide order fulfillment services, like receiving an order for a part, preparing a ticket to pull the part, providing addressing labels for packaging the part and tracking the shipping and delivery of the part. As one skilled in the art appreciates, these are only some of the examples of functions and features of application servers and application servers may be configured to provide various other services.

Device A and Device B may be any computing device, with one or more applications executed on the computing device, with a communication interface configured to communicate over the link 106. In one example, one or more of the devices may be passive devices that may not have computing resources, however, physically present or associated with a computing environment configured to communicate over the internet. In some examples, the computing environment may be static in the sense, fixed to a location. In some examples, the computing environment may be dynamic, in the sense, movable from one location to another location. Devices referenced in this disclosure may be alternatively referred to as objects.

Figure 2:
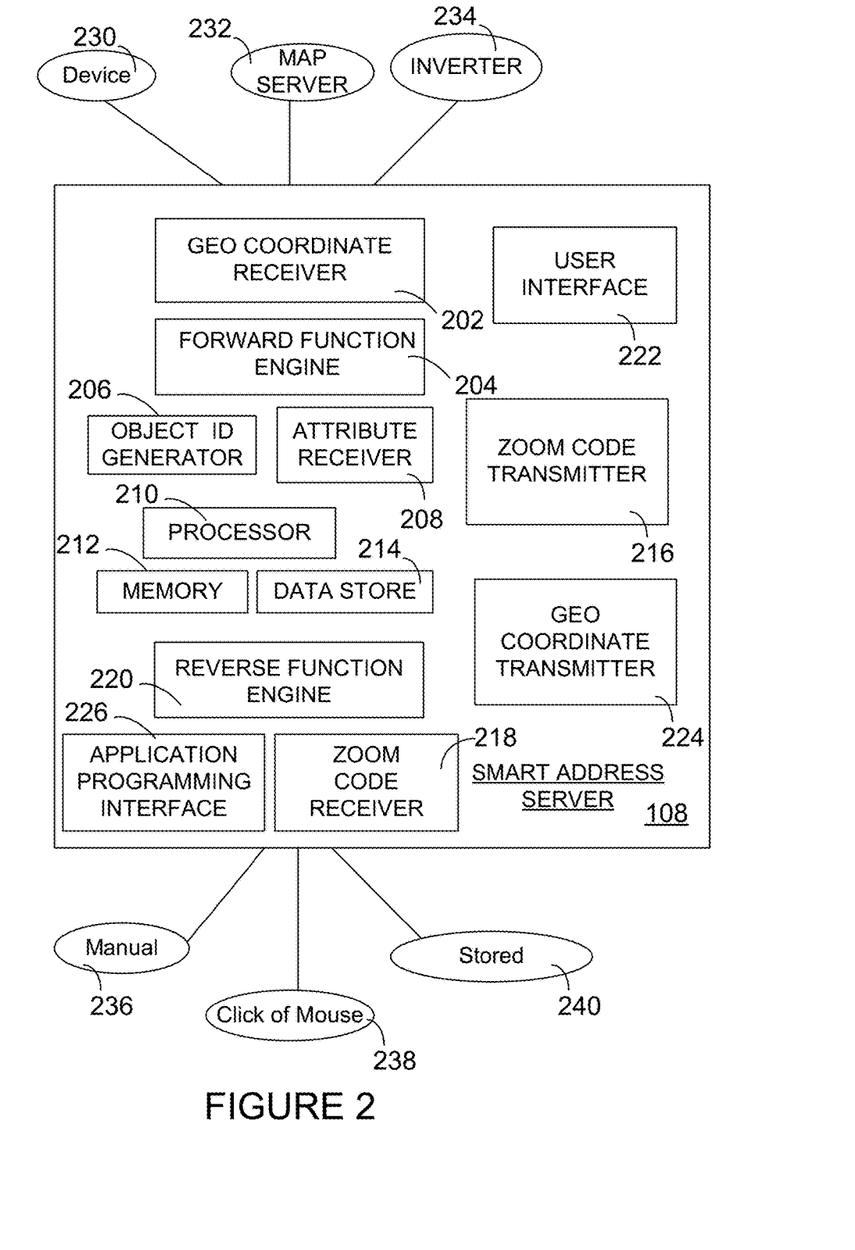
FIG. 2 depicts block diagram of an example smart address server of this disclosure.

Now, referring to FIG. 2, example smart address server 108 of this disclosure will be described. The smart address server 108 includes a geo coordinate receiver 202, a forward function engine 204, object ID generator 206, attribute receiver 208, processor 210, memory 212, data store 214, zoom code transmitter 216, zoom code receiver 218, reverse function engine 220, geo coordinate transmitter 224 and an application programming interface (API) 226. Various function and features of the smart address server 108 will now be described. Detailed operation of the smart address server 108 will be later described with reference to additional examples and figures.

The geo coordinate receiver 202 is configured to receive information related to geo location information for an object or a device. The geo location information for an object may be received from a device 230, a map server 232 or an inverter 234. The device 230 may be any computing device configured to communicate with the smart address server 108 and send information related to the geo location information for the object. A map server 232 may be a server configured to communicate with the smart address server 108, and send information related to the geo location information for the object. An inverter 234 may be a server configured to receive a physical address or location of the object, convert the physical address to information related to geo location information. The inverter 234 may be configured to communicate with the smart address server 108, and send information related to the geo location information for the object.

In some examples, the user interface 222 of the smart address server 108 may be configured to receive geo location information for an object and send the received information to the geo coordinate receiver 202. In some examples, the geo location information may be in the form of a latitude and longitude of the location the object is currently present or located.

The forward function engine 204 is configured to process the received geo location information and convert the geo location information into a zone, sector and target portion to generate a ZST location indicator for the object. Conversion of the received geo location information to a ZST location indicator will be later described in detail.

The object ID generator 206 is configured to generate a unique identification for the object. The unique identification for the object may be numeric, alpha numeric and may include one or more special characters. The unique identification for the object is associated with the generated ZST location.

The attribute receiver 208 is configured to receive one or more attributes for the object. In one example, the attributes are received using the user interface. In one example, the attributes may be electronically received from an external application, through the application programming interface 226. In one example, one of the attribute received is an elevation information for the object at the location where the object is located. In one example, the elevation information is appended as an elevation portion to the ZST location indicator to generate a ZSTE location indicator.

The processor 210 is configured to perform various arithmetic and logical functions of the smart address server 108. The memory 212 is used to stored and retrieve various programs, sub-routines, including transient and permanent information used or created by the processor 210. The data store 214 is used to store and retrieve various information generated or used by the smart address server 108. For example, the generated ZSTE location indicator along with various attributes of the object may be stored in the data store 214. In one example, the corresponding geo location indicator may also be associated with the ZSTE location indicator and stored in the data store 214.

The zoom code transmitter 216 is configured to transmit the ZSTE location indicator to an external device. In one example, the zoom code transmitter 216 may selectively retrieve the ZSTE location indicator stored in the data store 214 and transmit to an external device. As one skilled in the art appreciates, the smart address server 108 may include additional functional blocks capable of communicating with external devices, for example, using one or more communication protocols. The zoom code transmitter 216 may include those functional capabilities or use one or more of other functional blocks to perform these functions.

Zoom code receiver 218 is configured to receive a zoom code, for example, the ZSTE location indicator from an external device. In some example, the ZSTE location indicator may be received manually from an external device 236. In some examples, the ZSTE location indicator may be received from an application, based on a click of a mouse 238 or selection of a link displayed on a display device. In some example, the ZSTE location indicator may be received from a stored location, for example a data store 240 that is accessed by an application and transmitted to the smart address server 108.

The received ZSTE location indicator is then processed by the reverse function engine 220 to decode the ZSTE location indicator into a geo coordinate indicator, for example, latitude and longitude geo location indicator. In one example, the reverse function engine 220 may access the data store 214 and retrieve the geo coordinate indicator corresponding to the received ZSTE location indicator. In one example, the ZSTE location indicator may be decoded to generate the geo coordinate indicator by the reverse function engine 220. In this example, the reverse function engine is configured to perform operations performed by the forward function engine 204 to generate the ZST location indicator, in reverse order, to generate the geo coordinate indicator. The decoded geo coordinate indicator is then transmitted by the geo coordinate transmitter 224 to an external device. The geo coordinate indicator received by the external device may be used by one or more applications running on the device to provide additional services.

Figure 3:
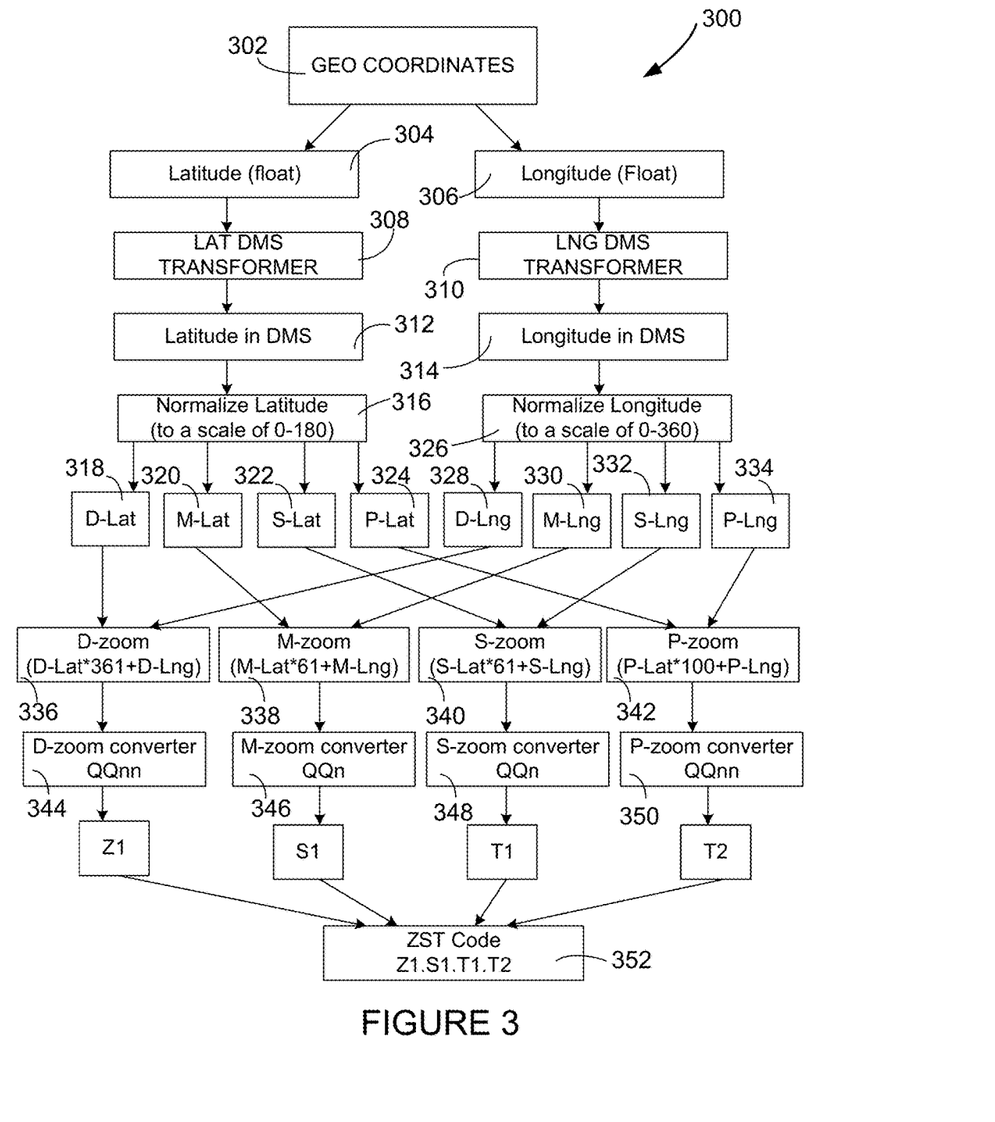
FIG. 3 shows block diagram of conversion of a geo location coordinates into a ZST location indicator, according to an example of this disclosure.

Having described an example smart address server 108 of this disclosure, now referring to FIG. 3, an example diagram 300 shows various operations to create a ZST location indicator, based on a geo location coordinates. Now, referring to FIG. 3, in block 302, the geo coordinates are received. For example, the geo coordinate receiver 202 of the smart address server 108 receives the geo location coordinates. The received geo coordinates include a latitude portion 304 and a longitude portion 306. The received latitude and longitude may be in the form of a float number. The lat dms transformer 308 converts the latitude (in float) to generate latitude represented as degrees, minutes and seconds (DMS) in block 312. The lng dms transformer 310 converts the longitude (in float) to generate longitude represented as degrees, minutes and seconds (DMS) in block 314.

Next, in block 316, the latitude in DMS is normalized to a scale of 0-180, to generate D-Lat 318, M-Lat 320, S-Lat 322 and P-Lat 324. Similarly, in block 326, the longitude in DMS is normalized to a scale of 0-360, to generate D-Lng 328, M-Lng 330, S-Lng 332 and P-Lng 334. As one skilled in the art appreciates, latitude is represented on a scale of −90 to +90 degrees. In this example, the latitude is normalized to a scale of 0-180, by adding 90 degrees to the latitude value. Similarly, the longitude is represented on a scale of −180 degrees to +180 degrees. In this example, the longitude is normalized to a scale of 0-360, by adding 180 degrees to the longitude value.

Next, in block 336, the D-Lat 318 and D-Lng 328 are combined to form a D-zoom. D-zoom is given by the formula D-zoom=(D-Lat*361+D-Lng). In this way, D-zoom is encoded with integer values of latitude and longitude. By encoding the D-zoom in this way, a reverse operation to recover latitude and longitude (degree) from D-zoom may be performed in an inverse operation. In an inverse operation, the value of D-zoom is divided by 361 and the quotient of that operation yields the latitude value. The remainder of that operation is then multiplied by 361 to get longitude value.

Similarly, in block 338, M-Lat 320 and M-Lng 330 are combined to form a M-zoom. In one example, the M-zoom is given by the formula M-zoom=(M-lat*61+M-Lng). In block 340, S-Lat 322 and S-Lng 332 are combined to form a S-zoom. In one example, the S-zoom is given by the formula S-zoom=(S-lat*61+S-Lng). Next, in block 342, P-Lat 324 and P-Lng 334 are combined to form a P-zoom. In one example, the P-zoom is given by the formula P-zoom=(P-lat*100+P-Lng).

As one skilled in the art appreciates, a reverse operation to recover latitude and longitude (minutes, seconds and precision) may be performed similar to as previously described with reference to D-zoom. by using a value by 61 instead of 361 for M-zoom and S-zoom and using a value of 100 instead of 361 for P-zoom. Further, generation of D-zoom, M-zoom, S-zoom and P-zoom as described above condenses two coordinates (latitude and longitude) into one coordinate form, without losing information so that we can run a reverse transformation to extract latitude and longitude from the ZST location indicator. Also, in this example, the precision portion P-zoom is considered to be two digits after decimal point (a 0-99 value, giving a multiplier of 100). However, other precision levels may be considered, for example, single digit after decimal point (multiplier of 10), three digits after decimal point (multiplier of 1000) etc.

In one example, the D-zoom represents the zone portion of the ZST location indicator. In one example, the M-zoom represents the sector portion of the ZST location indicator. In one example, S-zoom represents the target portion of the ZST location. In some examples, P-zoom may also form part of the target portion of the ZST location, giving a further granularity to the location of an object.

As one skilled in the art appreciates, the D-zoom, M-zoom, S-zoom and P-zoom are represented as integers using the operation described above. Representing the D-zoom, M-zoom, S-zoom and P-zoom in integers will require four 6 digit representations (24 digit value). Such a long representation of the location indicator may be cumbersome to remember and may require fields that may be too long to be represented on a display device or stored in a data store. In some examples, it may be advantageous to represent the D-zoom, M-zoom, S-zoom and P-zoom in an alpha-numeric format.

More specifically, in one example, the D-zoom is represented in a QQnn format, where "Q" represents an alpha character from an array of 26 characters, for example, characters A to Z and "n" represents a numeric character from an array of numbers {0,1,2,3,4,5,6,7,8,9}. Thus, QQnn has the ability to represent 26×26×10×10=67600 integer numbers, which exceeds the requirement to cover the product of all the normalized laititude and longitude numbers, which are equal to 64,900 integers, being the product of 360 degrees of longitude x 180 degrees of latitude.

Similarly, M-zoom is represented in QQn format, S-zoom is represented in QQn format and P-zoom is represented in QQnn format. In its alphanumeric form, QQn for M-zoom and S-zoom can represent 6,700 values. M-zoom requires covering 60 minutes of latitude x 60 minutes of longitude, which represents 3600 integer values. Similarly, S-zoom requires covering 60 seconds of latitude and 60 seconds of longitude, which represents 3600 integer values. Further, P-zoom represented as QQnn can represent 67,600 values, which is more than 100×100=10,000 values required to represent a two digit precision value. As one skilled in the art appreciates, such a representation of D-zoom, M-zoom, S-zoom and P-zoom provides for a fourteen digit representation of the ZST location indicator.

The D-zoom converter 344 converts the D-zoom into a QQnn format (as described above) to generate a zone portion Z1 of the ZST location indicator. The M-zoom converter 346 converts the M-zoom into a QQn format, to generate a sector portion Si of the ZST location indicator. The S-zoom converter 348 converts the S-zoom into a QQn format, to generate a target portion T1 of the ZST location indicator. The P-zoom converter 350 converts the P-zoom into a QQnn format, to generate another target portion T2 of the ZST location indicator. The Z1, S1, T1 and T2 portion are combined to form the ZST location indicator 352. In one example, the ZST location indicator 352 is represented as Z1.S1.T1.T2.

The P-zoom alphanumeric encoding allows for precision decimal values of latitude and longitude beyond degrees, minutes, and seconds. The example described above allows for an integer representation of 67,600 positions for P-zoom, leading to at least two decimal positions for latitude and longitude. Thus we can represent a latitude/longitude of for example, Lat:45 deg, 32 min, 56.53 seconds and Lng:−55 deg, 47 min, 35.41 seconds.

Figure 3A:
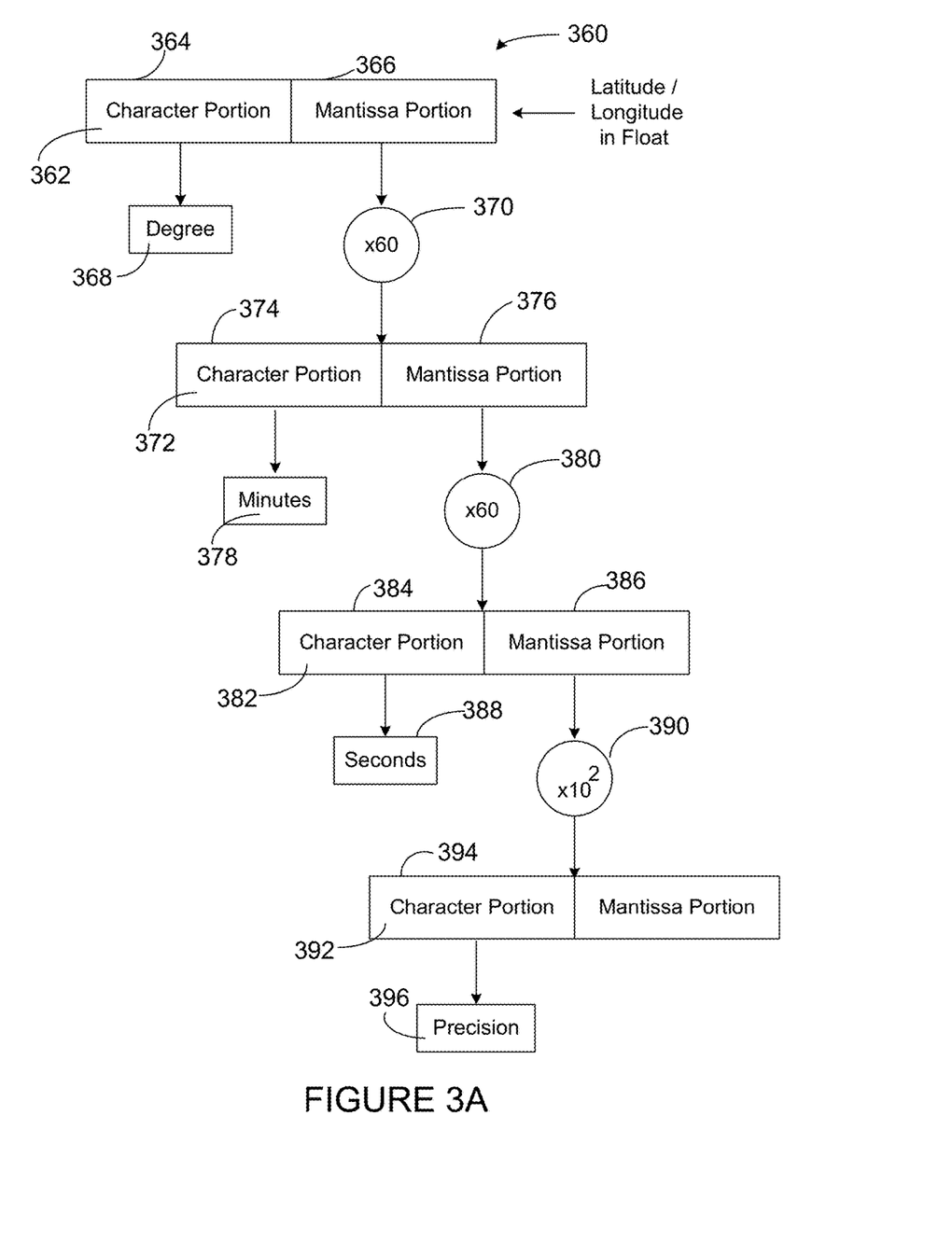
FIG. 3A shows an example block diagram to convert latitude and longitude in float format to a degrees, minutes and seconds format.

Having described generation of the ZST location indicator 352, referring to FIG. 3A, an example DMS transformer 360 is described. The DMS transformer 360 may be configured to be a Lat DMS transformer 304 or a Lng DMS transformer 306 as described with reference to FIG. 3. The latitude or longitude is represented as a float 362. The float 362 has a characteristic portion 364 and a mantissa portion 366. The characteristic portion of the float 362 is designated as the degree 368 of the latitude or longitude as the case may be. The mantissa portion 366 is multiplied by 60 by first multiplier 370 and generates a second float 372, with a characteristic portion 374 and mantissa portion 376. The characteristic portion 374 of the second float 372 is designated as the minutes 378 of the latitude or longitude as the case may be. The mantissa portion 376 of the second float 372 is multiplied by 60 by the second multiplier 380 and generates a third float 382, with a characteristic portion 384 and a mantissa portion 386. The characteristic portion 384 of the second float is designated as seconds 388 of the latitude or longitude as the case may be. The mantissa portion 386 of the third float 382 is multiplied by 10 to the power of 2 (100) by the third multiplier 390 and generates a fourth float 392, with a characteristic portion 394 and a mantissa portion 396. The characteristic portion 394 of the third float 392 is designated as precision 396 of the latitude or longitude as the case may be.

As one skilled in the art appreciates, in this example, three multipliers, first multiplier 370, second multiplier 380 and third multiplier 390 are described, a single multiplier may be configured to selectively perform various multiplications described above. Further, the degree 368 for latitude is normalized on a scale of 0 to 180. Similarly, the degree 368 for longitude is normalized on a scale of 0-360.

Figure 4:
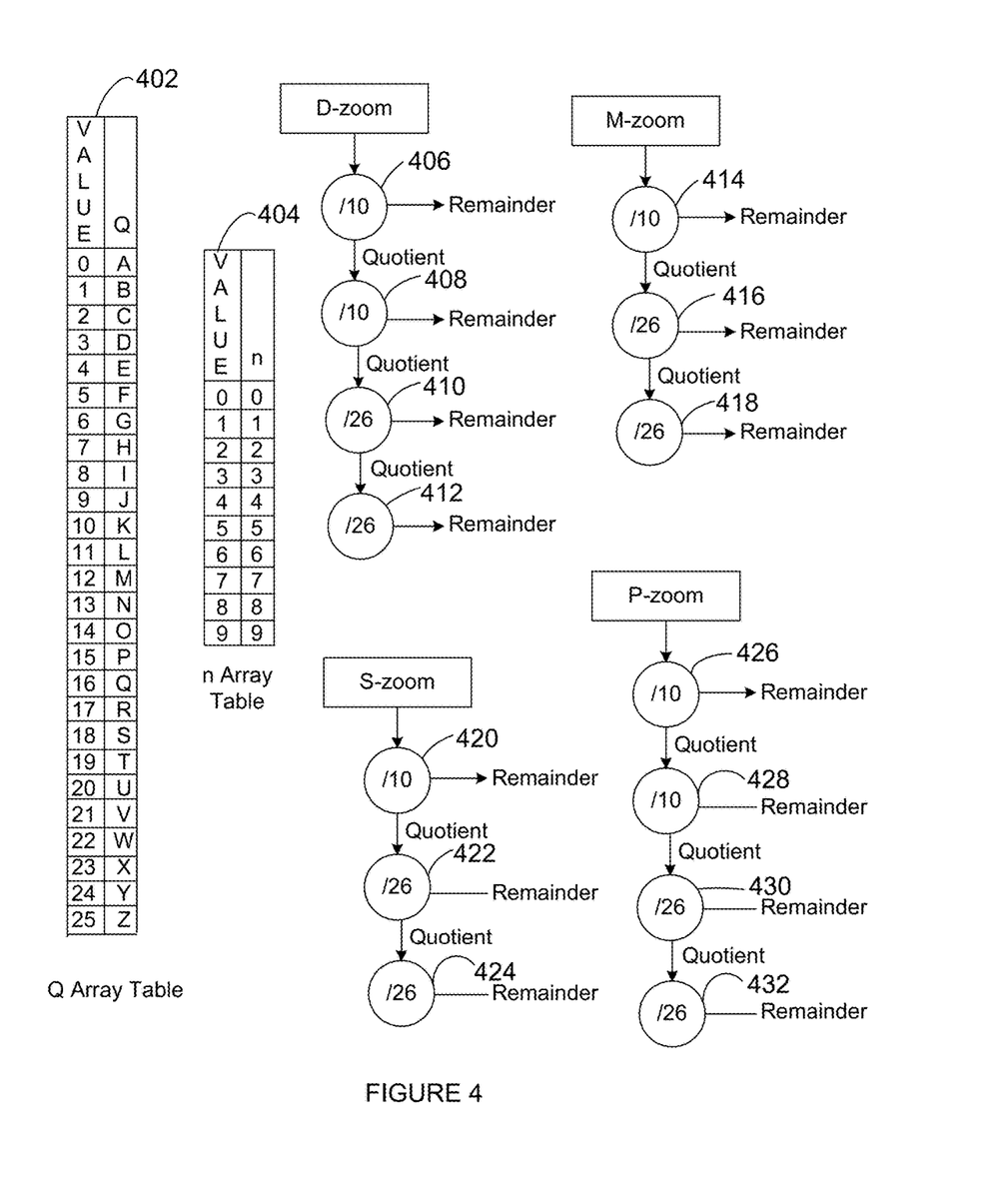
FIG. 4 shows an example conversion of D-zoom, M-zoom, S-zoom and P-zoom values into a ZST location indicator, according to an example of this disclosure.

Now, referring to FIG. 4, an example operation of a D-zoom converter, M-zoom converter, S-zoom converter and P-zoom converter will be described. FIG. 4 shows Q array table 402 and an n array table 404. In this example, the latitude in degrees (D-Lat) is 10 and longitude in degrees (D-Lng) is 5. The corresponding D-zoom code will be (D-lat*361+D-Lng), which is equal to 10*361+5=3615. The D-zoom code is converted to QQnn format, by continuously reducing D-zoom by 10 twice and by 26 twice and collecting the resulting character from the Q array table 402 and n array table 404.

In this example, the D-zoom code value of 3615 is divided by 10 by first divider 406, giving a quotient of 361 and remainder value of 5. Looking up the remainder value of 5 in the n array table 404, we get a "n" value of 5. Next, the quotient of 361 is divided by 10 by second divider 408 gives a quotient of 36 and a remainder of 1. Looking up the remainder value of 1 in then array table 404, we get next "n" value of 1. Next, the quotient of 36 is divided by 26 by the third divider 410 gives a quotient of 1 and a remainder of 10. Looking up the remainder value of 10 in the Q array table 402, we get the "Q" value of K. next, the quotient of 1 is divided by 26 by the fourth divider 412 gives a quotient of 0 and a remainder of 1. Looking up the remainder value of 1 in the Q array table 402, we get the next "Q" value of B. Now, assembling the Q values and n values, we get a code of BK15 for a D-zoom code value of 3615.

In this example, the latitude in minutes (M-Lat) is 10 and longitude in minutes (M-Lng) is 5. The corresponding M-zoom code will be (M-lat*61+M-Lng), which is equal to 10*61+5=615. The M-zoom code is converted to QQn format, by continuously reducing M-zoom by 10 once and by 26 twice and collecting the resulting character from the Q array table 402 and n array table 404.

In this example, the M-zoom code value of 615 is divided by 10 by fifth divider 414, giving a quotient of 61 and remainder value of 5. Looking up the remainder value of 5 in the n array table 404, we get a "n" value of 5. Next, the quotient of 61 is divided by 26 by sixth divider 416 which gives a quotient of 36 and a remainder of 9. Looking up the remainder value of 9 in the Q array table 402, we get "Q" value of J. Next, the quotient of 2 is divided by 26 by the seventh divider 418 gives a quotient of 0 and a remainder of 2. Looking up the remainder value of 2 in the Q array table 402, we get the next "Q" value of C. Now, assembling the Q values and n values, we get a code of CJ5 for a M-zoom code value of 615.

In this example, the latitude in seconds (S-Lat) is 10 and longitude in seconds (S-Lng) is 5. The corresponding S-zoom code will be (S-lat*61+S-Lng), which is equal to 10*61+5=615. The S-zoom code is converted to QQn format, by continuously reducing M-zoom by 10 once and by 26 twice and collecting the resulting character from the Q array table 402 and n array table 404.

In this example, the S-zoom code value of 615 is divided by 10 by eighth divider 420, giving a quotient of 61 and remainder value of 5. Looking up the remainder value of 5 in the n array table 404, we get a "n" value of 5. Next, the quotient of 61 is divided by 26 by ninth divider 422 which gives a quotient of 36 and a remainder of 9. Looking up the remainder value of 9 in the Q array table 402, we get "Q" value of J. Next, the quotient of 2 is divided by 26 by the tenth divider 424 which gives a quotient of 0 and a remainder of 2. Looking up the remainder value of 2 in the Q array table 402, we get the next "Q" value of C. Now, assembling the Q values and n values, we get a code of CJ5 for a S-zoom code value of 615.

In this example, the latitude precision (P-Lat) is 10 and longitude precision (P-Lng) is 5. The corresponding P-zoom code will be (P-lat*100+P-Lng), which is equal to 10*100+5=1005. The P-zoom code is converted to QQnn format, by continuously reducing P-zoom by 10 twice and by 26 twice and collecting the resulting character from the Q array table 402 and n array table 404.

In this example, the P-zoom code value of 1005 is divided by 10 by eleventh divider 426, giving a quotient of 100 and a remainder value of 5. Looking up the remainder value of 5 in the n array table 404, we get a "n" value of 5. Next, the quotient of 100 is divided by 10 by twelfth divider 428 gives a quotient of 10 and a remainder of 0. Looking up the remainder value of 0 in the n array table 404, we get next "n" value of 0. Next, the quotient of 10 is divided by 26 by the thirteenth divider 430 gives a quotient of 0 and a remainder of 10. Looking up the remainder value of 10 in the Q array table 402, we get the "Q" value of K. Next, the quotient of 0 is divided by 26 by the fourth divider 412 gives a quotient of 0 and a remainder of 0. Looking up the remainder value of 0 in the Q array table 402, we get the next "Q" value of A. Now, assembling the Q values and n values, we get a code of AK05 for a P-zoom code value of 1005.

In some examples, the P-zoom code value may be less than four digits, for example, if the precision of the geo location indicator has a single digit or no digits for the precision. In such a case, one or more zeros are added to the MSB (most significant bit) of the P-zoom code value, to generate a four digit P-zoom code value. For example, if the P-zoom code value was 105, then one zero is added to create the P-zoom value of 0105 and then, corresponding QQnn values are derived for the P-zoom code value.

Figure 4A:
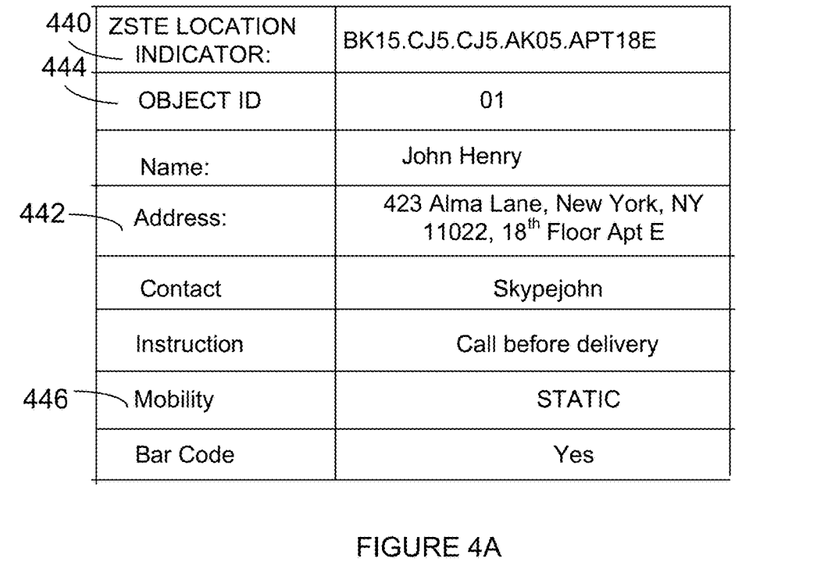
FIG. 4A and 4B show example ZSTE location indicator for two different objects, located at the same location, along with various attributes of the objects, according to an example of this disclosure.

In summary, the ZST location indicator in this example will be BK15.CJ5.CJ5.AK05. As previously described, in some examples, an elevation portion may be appended to the ZST location indicator to form a ZSTE location indicator. For example, if the ZST location indicator indicated a multi-story apartment and the object location was apartment 18E, then, the ZSTE location indicator may be constructed by appending the apartment location. For example, the ZSTE location indicator may be of the form BK15.CJ5.CJ5.AK05.APT18E. FIG. 4A shows an example ZSTE location indicator for the object apartment 18E, along with additional attributes associated with the object.

As one skilled in the art appreciates, the elevation portion of the ZSTE location indicator may be determined and added to the ZST location indicator in various different ways. In some examples, the elevation indicator may be received from a user from a user interface. In some examples, the elevation indicator may be selectively extracted from a record, for example, address field of a record stored in a data store. In some examples, the elevation indicator may be received from a device, for example, a phone, a drone or an aircraft capable of providing altitude information. In some examples, the elevation information may be received from a GIS systems, for example, terrain maps. In some examples, the elevation indicator may be derived based on a datum (or reference elevation, say ground floor) and adding increments to elevation from the datum (for example, adding number of floors from the datum or adding increments to elevation, based on height of each floor). In some examples, elevation indicator may be derived from mean sea level and diving depths from mean sea level, for example, from a submarine or a sub sea vehicle.

Now, referring to FIG. 4A, we notice that the ZSTE location indicator 440 for address 442 is shown as BK15.CJ5.CJ5.AK05.APT18E. Further, an object ID 444 of "01" is assigned to this ZSTE location indicator. Name associated with this ZSTE location indicator is "John Henry". Contact information is to use "skypejohn". Instruction for delivery of packages is to "call before delivery". The mobility 446 field of this object is set to "static", in other words, the associated ZSTE location indicator is fixed and does not change. If on the other hand, if the mobility 446 field of this object was set to "mobile", then the ZSTE location indicator for the object would change, based on a changed location of the object. For example, instead of John's apartment, if the object was John's car, the mobility field may be set to "mobile". Then, the ZSTE location indicator of the object car would change when the car moves from one location to another.

Figure 4B:
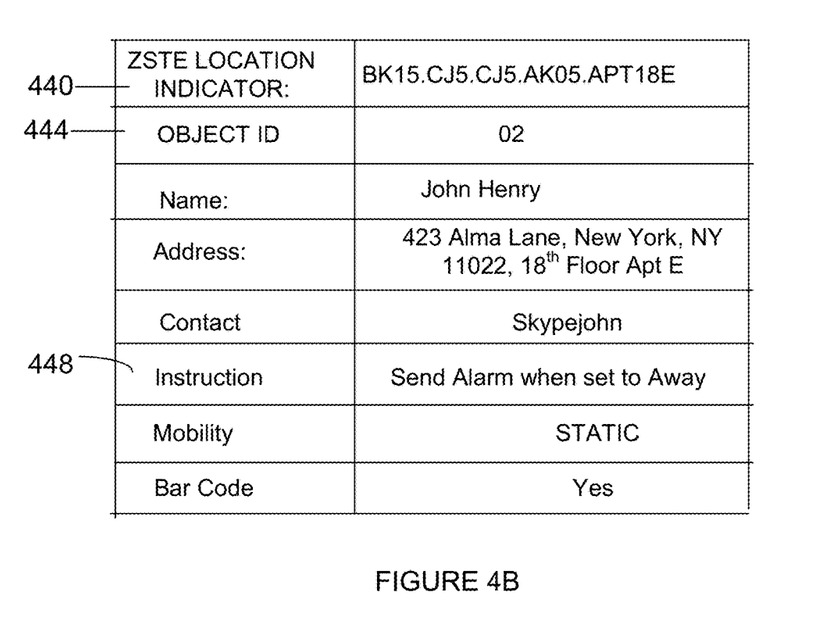

Now, referring to FIG. 4B, another ZSTE location indicator along with associated attributes are shown. In this example, the ZSTE location indicator 440 is same as the ZSTE location indicator shown in FIG. 4A. However, the object ID for this location indicator is set to "02". In this example, the object is a security camera, which can send an alarm when motion is detected. The owner is still John Henry and address is still the same as shown in FIG. 4A. However, in Instruction 448 field, it is set to "Send Alarm when set to Away". In other words, if the security camera is set to monitor motion within the apartment, then an alarm is sent to John, when motion is detected.

As one skilled in the art appreciates, by selectively changing the object ID, same ZSTE location indicator is used to identify and track different objects. These different objects may have different attributes associated with them. In one example, the ZSTE location identifier is associated with the object ID to generate a smart address for the object. In some examples, the object ID may be appended to the ZSTE location indicator to generate the smart address for the object. For example, smart address for the apartment may take the form of BK15.CJ5.CJ5.AK05.APT18E.01. Similarly, the smart address for the security camera may take the form of BK15.CJ5.CJ5.AK05.APT18E.02. And, various attributes of the apartment object and security camera object may be stored in a data store in the smart address server 108.

Figure 4C:
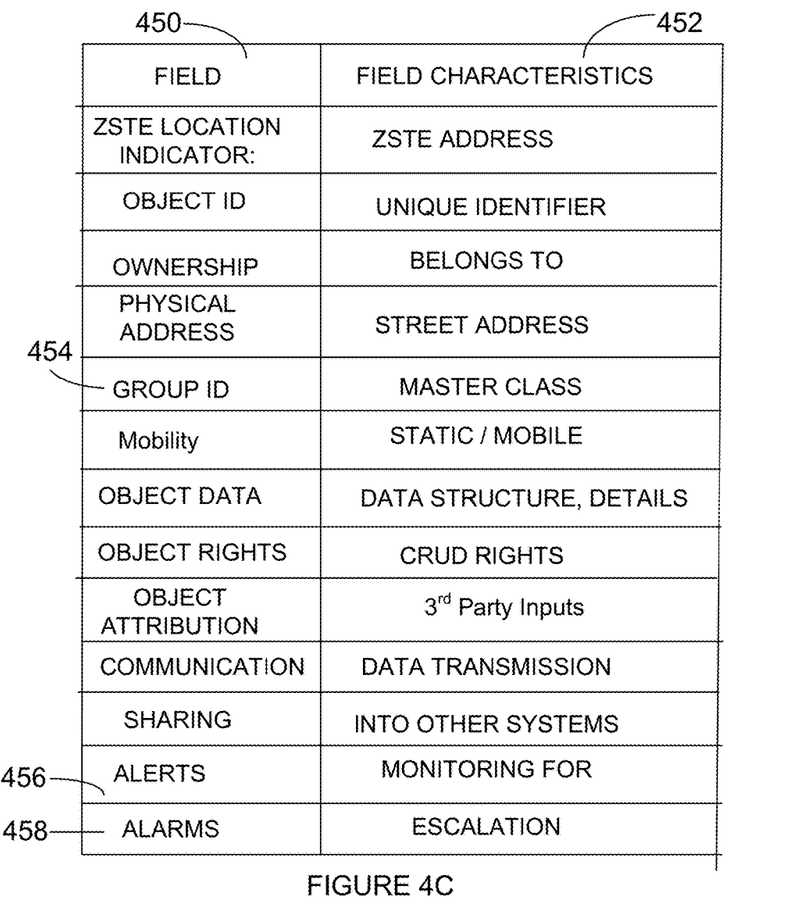
FIG. 4C shows an example ZSTE location indicator and associated attributes, according to an example of this disclosure.

Now, referring to FIG. 4C, yet another ZSTE location indicator along with associated attributes are shown. In this example, column 450 shows various fields and column 452 shows field characteristics. Some of the fields not previously described with reference to FIGS. 4A and 4B will be described with reference to FIG. 4C. For example, referring to row 454, a group ID field is defined. In one example, the group ID field may indicate a master class various objects may belong to. In some examples, the group ID may refer to a collection of various objects, with each having their own smart address, but having a common group ID. Referring to row 456, an alerts field is defined. The alert field may indicate one or more threshold values that are monitored for, for example, using a sensor or other detecting mechanisms. Referring to row 458, an alarms field is defined. The alarm field may indicate escalation to a third party, for example, generation of an alarm or a notification, when a threshold value set in the alerts field is exceeded.

In some examples, the sensor or other detecting mechanism may not be part of the object being monitored, but may be part of another object that is in the same environment as the object being monitored. In such a situation, the object being monitored and another object that has the sensor or other detecting mechanism may be grouped or associated with each other. In this way, an object that may not have "smarts" can be monitored and controlled, based on a signal received from another object that has the capability to monitor. In some examples, the "Group ID" attribute previously described may be advantageously used to provide "smart" capability to a "dumb" object, by selectively using a "Group ID" for multiple objects to be monitored.

In yet another examples, a collection of plurality of objects may be provided a "Group ID". In one example, all the objects in the collection are considered to be "mobile" and so have a changing ZSTE location identifier based on their location. The collection may be a pallet with multiple objects. In one example, the pallet may be part of another "Group ID", where one or more objects in that group may have the capability to transmit its location. In one example, the location of the pallet is periodically tracked and its corresponding ZSTE location indicator is changed based on the location. Once the pallet ZSTE location identifier is changed, the ZSTE location of all the other objects in the pallet can be advantageously changed.

Figure 4D:
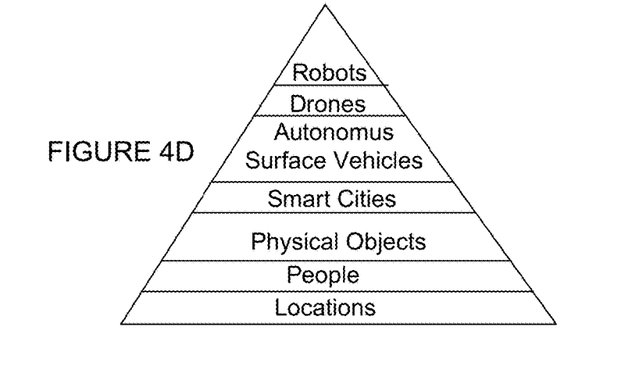
FIG. 4D shows various objects that may be associated with a ZSTE location indicator, according to an example of this disclosure.

Referring to FIG. 4E, various things that may be considered as objects to be assigned a ZSTE location indicators is shown. For example, an object may be a location, people, physical objects, autonomous surface vehicles, drones, and robots or any other thing or item that may be represented with a ZSTE location indicator.

Figure 5A:
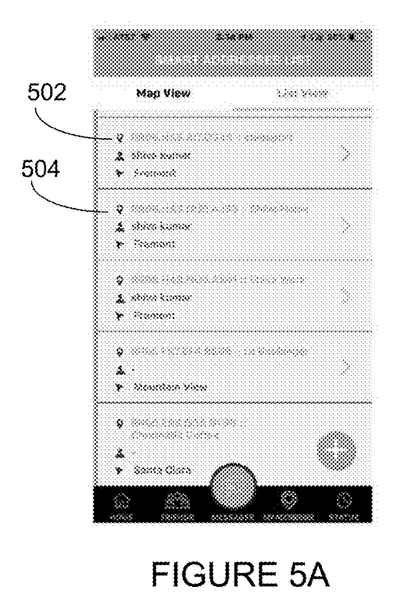
FIGS. 5A and 5B show an example display of ZSTE location indicator on a display device, according to an example of this disclosure.
Figure 5B:
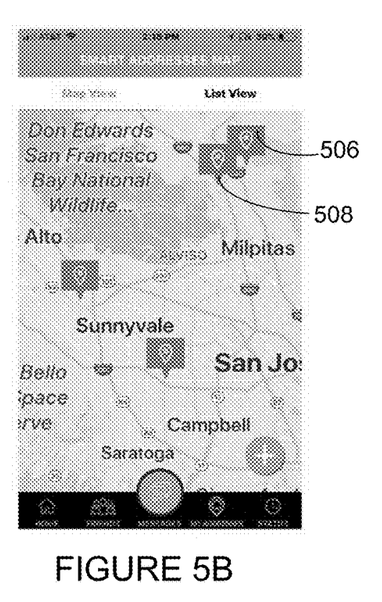

Now, referring to FIG. 5A and 5B, an example display of ZSTE location indicator on a display device of a computing device is shown. In FIG. 5A, various ZSTE location indicators and associated attributes are shown as a list, under "List View" folder. In FIG. 5B, various ZSTE location indicators are shown as an indicia on a map, under "Map View" folder. Now, referring to FIG. 5A, under the list view, the ZSTE location 502 for "clubsport" is shown. Similarly, ZSTE location 504 for Shiva Home is also shown. In this example, the elevation portion is not shown, as these locations are considered to be at ground level. In one example, when the "Map view" folder is selected, each of the ZSTE location indicators in the list view is sent to the smart address server, to receive corresponding geo locations for each of the locations. For example, the corresponding geo location may include the latitude and longitude of each or the objects. In some examples, the corresponding geo locations may be sent to a map server. The map server maps each of the geo locations on a map as an indicia and sends the map along with the indicia to the device, so that the map along with the indicia can be displayed on the display device. For example, the map along with the indicia of the location is shown on the display device in Map View. For example, the "clubsport" is shown by indicia 506 and "Shiva Home" is shown by indicia 508 in FIG. 5B.

Figure 5C:
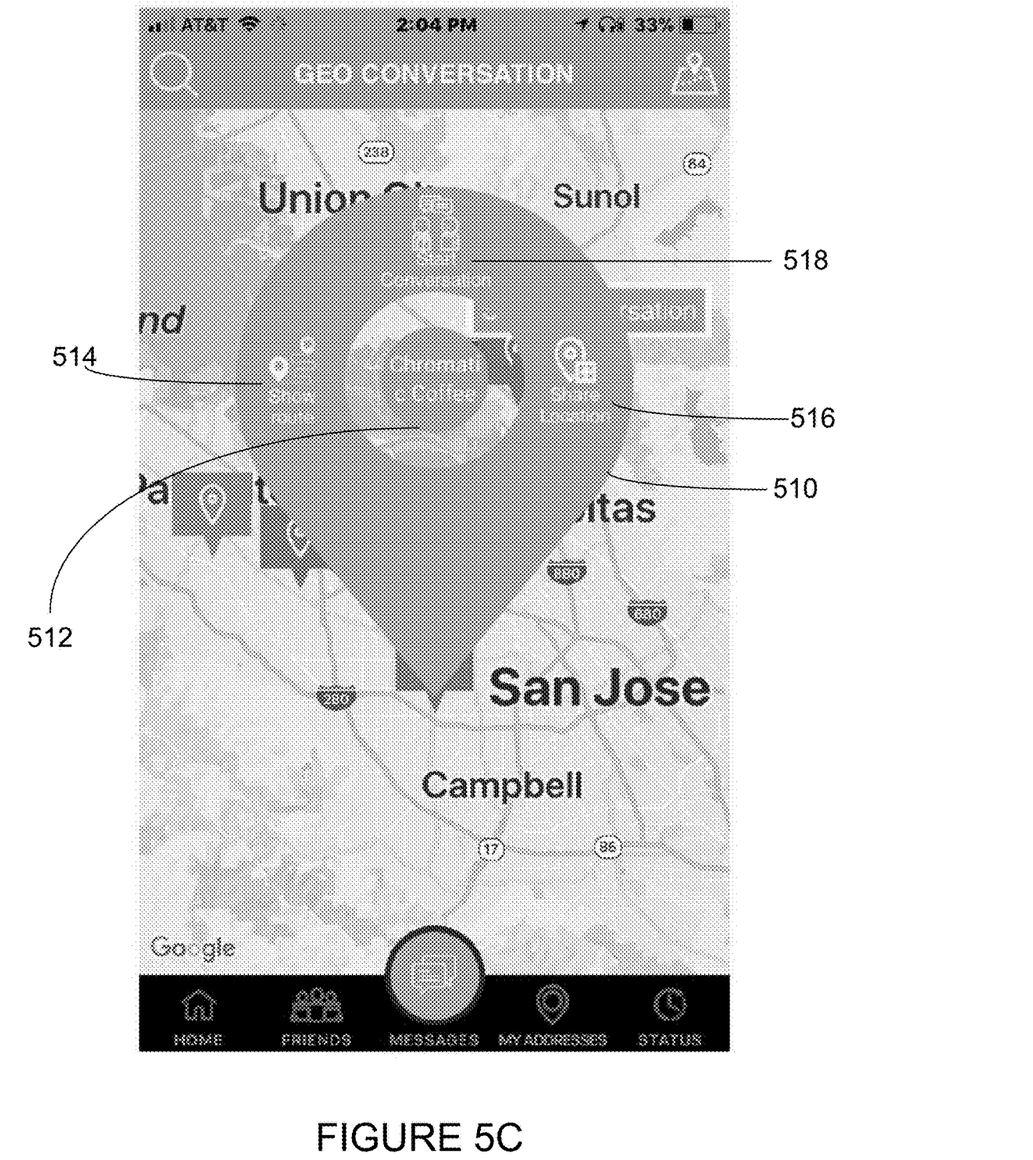
FIG. 5C shows an example display device with various ZSE location indicators along with a menu option, according to an example of this disclosure.

Now, referring to FIG. 5C, an example display device with various ZSTE locations is shown. In one example, when one of the ZSTE location indicator indicia is clicked or selected, a menu option 510 is displayed. The menu option 510 displays the name of the location 512 and provides various options for selection. For example, show route 514, share location 514 and conversation 516 options are presented. By selectively enabling one of these menu options, additional activities associated with each of the option is performed. For example, show route 514 option may display recommended route to the location, from the device location. Share location 516 option may permit the device user to share the selected location with another user. Conversation 518 option may open a communication link with another user and permit communication between the device user and another selected user.

Figure 5D:
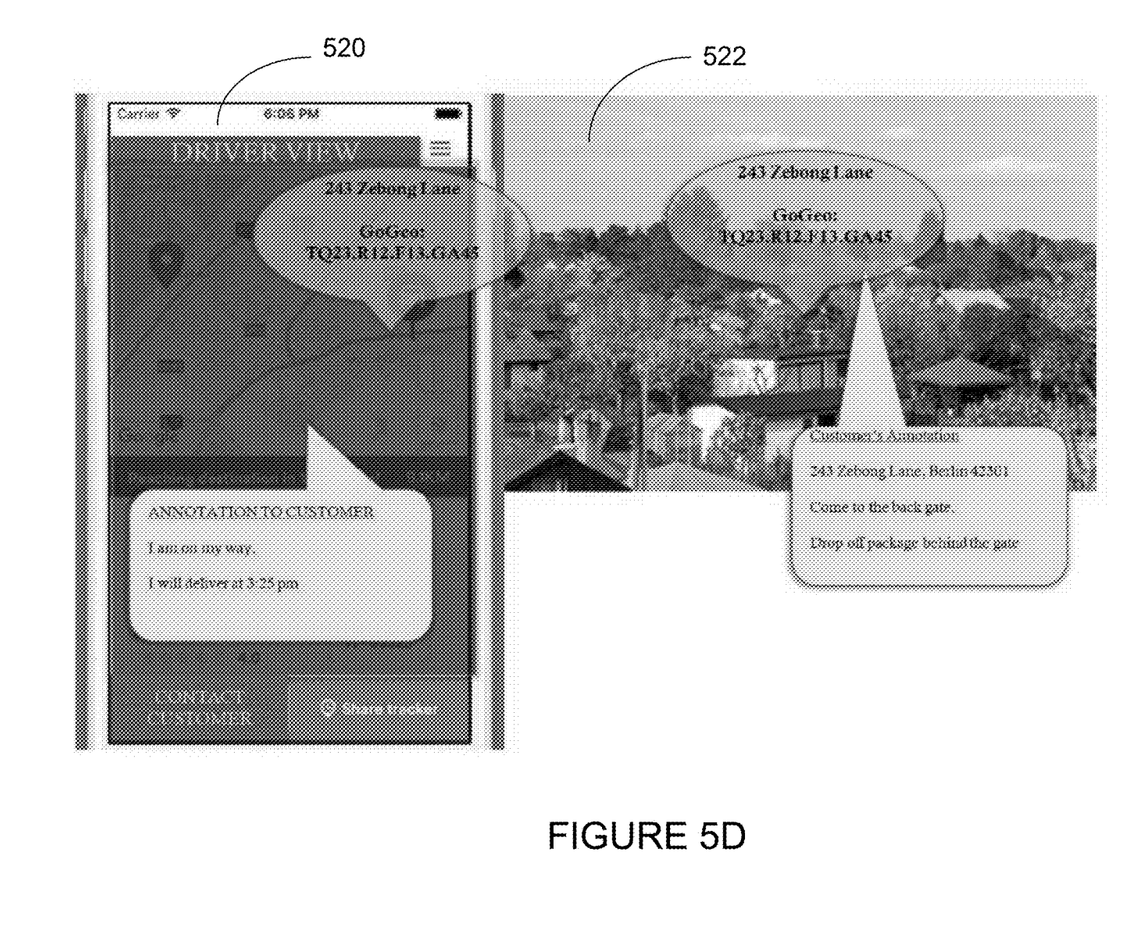
FIG. 5D shows an example conversation between two display devices using ZSTE location indicator, according to an example of this disclosure.

Now, referring to FIG. 5D, an example conversation that may be initiated between a delivery person who is delivering a package to a receiver is shown. The delivery person device 520 shows various conversation initiated by the delivery person to the receiver, using the menu option 510 described with reference to FIG. 5C. In one example, the delivery person initiates the conversation with the receiver, based on the ZSTE location indicator and associated attributes of the receiver. The receiver device 522 shows various conversation initiated by the receiver to the delivery person. As one skilled in the art appreciates, various attributes of the smart address may be advantageously used to communicate and collaborate with multiple objects and people.

Figure 6:
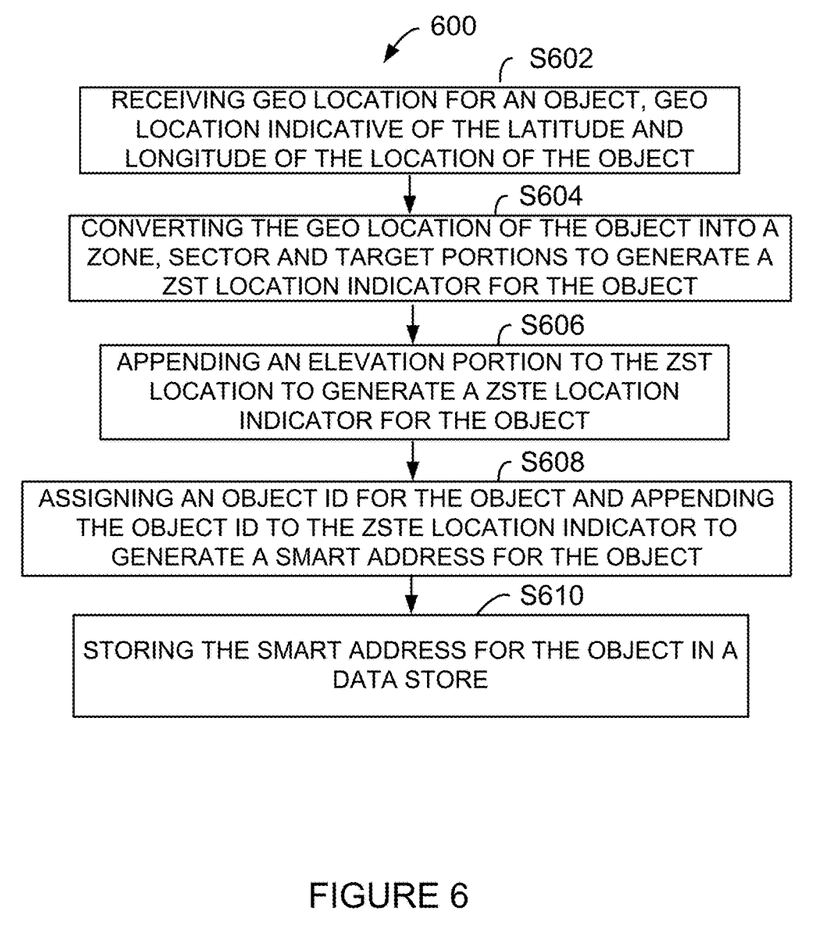
FIG. 6 shows an example flow diagram to generate ZSTE location indicator and a smart address for an object, according to an example of this disclosure.

Now, referring to FIG. 6 an example flow diagram 600 is described. In block S602, geo location for an object is received, the geo location indicative of the latitude and longitude of the location of the object. For example, the geo coordinate receiver 202 of the smart address server 108 may be configured to receive the geo location of the object, as shown and described with reference to FIG. 2.

In block S604, the geo location of the object is converted into a zone, sector and target portion to generate a ZST location indicator for the object. For example, the ZST location indicator for the object is generated by the smart address server 108, as previously described with reference to FIGS. 2, 3, 3A and 4.

In block S606, an elevation portion is appended to the ZST location indicator to generate a ZSTE location indicator for the object. For example, as described with reference to FIGS. 4A and 4B, an elevation portion is appended to the ZST location indicator to generate a ZSTE location indicator.

In block S608, an object ID for the object is assigned and the object ID is associated to the ZSTE location indicator to generate a smart address for the object. For example, as shown and described with reference to FIGS. 4A and 4B, an object ID is associated to the ZSTE location indicator to generate a smart address for the object.

In block S610, the smart address for the object is stored in a data store. For example, the generated smart address for the object is stored in a data store in the smart address server 108.

The embodiments disclosed herein can be implemented through at least one software program running on at least one hardware device and performing various functions of the security appliance. Various functions of the smart address server as described herein can be at least one of a hardware device, or a combination of hardware device and software module.

The hardware device can be any kind of device which can be programmed including e.g. any kind of computer like a server or a personal computer, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. Thus, the means are at least one hardware means, and at least one software means. The method embodiments described herein could be implemented in pure hardware or partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method for associating an address for an object, comprising:
providing a smart address server, with a processor and memory, the smart address server configured to:
receiving geo location for the object, the geo location indicative of the latitude and longitude of the location of the object;
converting the geo location for the object into a zone, sector and target portion to generate a ZST location indicator for the object;
appending an elevation portion to the ZST location, to generate a ZSTE location indicator for the object;
assigning an object ID for the object and appending the object ID to the ZSTE location indicator to generate a smart address for the object; and
storing the generated smart address for the object in a data store.

2. The method of claim 1, further including appending an attribute portion to the smart address for the object.

3. The method of claim 2, wherein the attribute portion includes one or more of the attributes associated with the object.

4. The method of claim 3, wherein one of the attribute associated with the object is indicative of a mobile object.

5. The method of claim 3, wherein one of the attribute associated with the object is indicative of a stationary object.

6. The method of claim 4, wherein the ZSTE location of the smart address for the object is changed based on a change in the location of the object.

7. The method of claim 1, further including:
receiving the smart address for the object; and
converting the smart address for the object to the geo location indicative of the latitude and longitude of the location of the object.

8. The method of claim 7, further including:
sending the geo location indicative of the latitude and longitude of the location of the object to an application configured to present an indicia of the object on a map displayed on a display device.

9. The method of claim 3, wherein one of the attribute associated with the object is indicative of a threshold limit for an environment the object is subjected to,
monitoring the environment the object is subjected to; and
generating an alert when the environment the object is subjected to exceeds the threshold limit.

10. The method of claim 4, further including:
providing a collection of a plurality of objects, where each of the plurality of objects is a mobile object with its own smart address;
assigning a smart address to the collection;
tracking the movement of the collection; and
updating the ZSTE location of each of the plurality of objects based on a change in the location of the collection.

11. A system to associate an address for an object, comprising:
a smart address server, with a processor and memory, the smart address server configured to:
receive a geo location for the object, the geo location indicative of the latitude and longitude of the location of the object;
convert the geo location for the object into a zone, sector and target portion to generate a ZST location indicator for the object;
append an elevation portion to the ZST location, to generate a ZSTE location indicator for the object;
assign an object ID for the object and append the object ID to the ZSTE location indicator to generate a smart address for the object; and
store the generated smart address for the object in a data store.

12. The system of claim 11, further including append an attribute portion to the smart address for the object.

13. The system of claim 12, wherein the attribute portion includes one or more of the attributes associated with the object.

14. The system of claim 13, wherein one of the attribute associated with the object is indicative of a mobile object.

15. The system of claim 13, wherein one of the attribute associated with the object is indicative of a stationary object.

16. The system of claim 14, wherein the ZSTE location of the smart address for the object is changed based on a change in the location of the object.

17. The system of claim 11, further including:
receive the smart address for the object; and
convert the smart address for the object to the geo location indicative of the latitude and longitude of the location of the object.

18. The system of claim 17, further including:
send the geo location indicative of the latitude and longitude of the location of the object to an application configured to present an indicia of the object on a map displayed on a display device.

19. The system of claim 13, wherein one of the attribute associated with the object is indicative of a threshold limit for an environment the object is subjected to,
monitor the environment the object is subjected to; and
generate an alert when the environment the object is subjected to exceeds the threshold limit.

20. The system of claim 14, further including:
provide a collection of a plurality of objects, where each of the plurality of objects is a mobile object with its own smart address;
assign a smart address to the collection;
track the movement of the collection; and
update the ZSTE location of each of the plurality of objects based on a change in the location of the collection of the plurality of objects.

* * * * *